United States Patent
Kuo (10) Patent No.: US 11,209,866 B2
(45) Date of Patent: Dec. 28, 2021

(54) FOLDABLE ELECTRONIC DEVICE

(71) Applicant: Acer Incorporated, New Taipei (TW)

(72) Inventor: Yan-Lin Kuo, New Taipei (TW)

(73) Assignee: Acer Incorporated, New Taipei (TW)

( * ) Notice: Subject to any disclaimer, the term of this patent is extended or adjusted under 35 U.S.C. 154(b) by 33 days.

(21) Appl. No.: 16/817,638

(22) Filed: Mar. 13, 2020

(65) Prior Publication Data

US 2021/0011523 A1 Jan. 14, 2021

(30) Foreign Application Priority Data

Jul. 11, 2019 (TW) .................... 108209104

(51) Int. Cl.
*G06F 1/16* (2006.01)
*H04M 1/02* (2006.01)

(52) U.S. Cl.
CPC .......... *G06F 1/1652* (2013.01); *G06F 1/1641* (2013.01); *G06F 1/1681* (2013.01); *H04M 1/022* (2013.01); *H04M 1/0268* (2013.01)

(58) Field of Classification Search
CPC .... G06F 1/1681; G06F 1/1652; G06F 1/1641; G06F 1/1647; H04M 1/0268; H04M 1/022
See application file for complete search history.

(56) References Cited

U.S. PATENT DOCUMENTS

| | | | | |
|---|---|---|---|---|
| 9,173,287 B1* | 10/2015 | Kim | ...................... | G06F 1/1616 |
| 9,625,947 B2* | 4/2017 | Lee | ...................... | G06F 1/1616 |
| 9,930,794 B2* | 3/2018 | Luan | ...................... | H05K 7/14 |
| 10,091,896 B2* | 10/2018 | Chu | ...................... | H05K 5/0226 |
| 10,129,991 B2* | 11/2018 | Lin | ...................... | H05K 5/0217 |
| 10,287,808 B2* | 5/2019 | Zhang | ...................... | E05D 3/18 |
| 10,599,189 B1* | 3/2020 | Hsu | ...................... | G06F 1/1681 |
| 2017/0060188 A1* | 3/2017 | Han | ...................... | G06F 1/1681 |
| 2017/0287385 A1* | 10/2017 | Lian | ...................... | H04M 1/0216 |
| 2018/0150107 A1* | 5/2018 | Lee | ...................... | G06F 1/1681 |
| 2018/0183911 A1* | 6/2018 | Lee | ...................... | H04M 1/02 |

* cited by examiner

*Primary Examiner* — Nidhi Thaker
(74) *Attorney, Agent, or Firm* — JCIPRNET (57) ABSTRACT

A foldable electronic device includes a first casing, a second casing, a hinge structure and a foldable display. The hinge structure includes a first frame, a second frame, a plurality of first hinge block sets and a plurality of second hinge blocks, wherein the first frame is connected to the first casing and the second frame is connected to the second casing. The two adjacent first hinge block sets are connected by one of the second hinge blocks. The foldable display includes a first bonding portion secured to the first casing, a second bonding portion secured to the second casing and a foldable portion located between the first bonding portion and the second casing, wherein the foldable portion is aligned with the hinge structure.

9 Claims, 7 Drawing Sheets

FIG. 5C

FOLDABLE ELECTRONIC DEVICE

CROSS-REFERENCE TO RELATED APPLICATION

This application claims the priority benefit of Taiwan application serial no. 108209104, filed on Jul. 11, 2019. The entirety of the above-mentioned patent application is hereby incorporated by reference herein and made a part of this specification.

BACKGROUND

Technical Field

The disclosure relates to an electronic device, and more particularly to a foldable electronic device.

Description of Related Art

With the development of display technology, the technology of foldable display is becoming more and more mature. In recent years, electronics manufacturers have been actively involved in the development and application of foldable display. Take foldable display being integrated to smartphone, tablet computer or notebook computer for example, the commonly seen designs are the outward folded design in which the display surface of the folded foldable display is folded outwardly and the inward folded design in which the display surface of the folded foldable display is folded inwardly. However, most of the unfolded foldable displays have the problem of poor flatness. Therefore, how to improve the flatness of the unfolded foldable display has become an urgent issue to be solved.

SUMMARY

The disclosure provides a foldable electronic device in which the unfolded foldable display has good flatness.

The foldable electronic device includes a first casing, a second casing, a hinge structure and a foldable display. The hinge structure includes a first frame, a second frame, a plurality of first hinge block sets and a plurality of second hinge blocks. The first frame is connected to the first casing and the second frame is connected to the second casing. The first hinge block sets are arranged between the first frame and the second frame, and thus connecting the first frame and the second frame. The two adjacent first hinge block sets are connected by one of the first second hinge blocks. The foldable display includes a first bonding portion secured to the first casing, a second bonding portion secured to the second casing, and a foldable portion between the first bonding portion and the second bonding portion, wherein the foldable portion is aligned with the hinge structure.

Based on the above, the two casings of the foldable electronic device of the disclosure can be relatively rotated via the hinge structure, and thus the foldable electronic device is transformed from a folded state to an unfolded state. Furthermore, during the process of the foldable electronic device being transformed from the folded state to the unfolded state, the hinge structure is transformed from a bent state to a flat state and generates a stroke difference. Meanwhile, the two casings are driven by the hinge structure, such that the distance between the two casings is gradually increased. Accordingly, after the foldable electronic device is transformed to the unfolded state and the hinge structure is transformed to the flat state, the foldable display driven by the two casings can be flattened and has good flatness.

The above described features and advantages of the present invention will become more apparent and understood from the following description.

DESCRIPTION OF THE EMBODIMENTS

Figure 1:
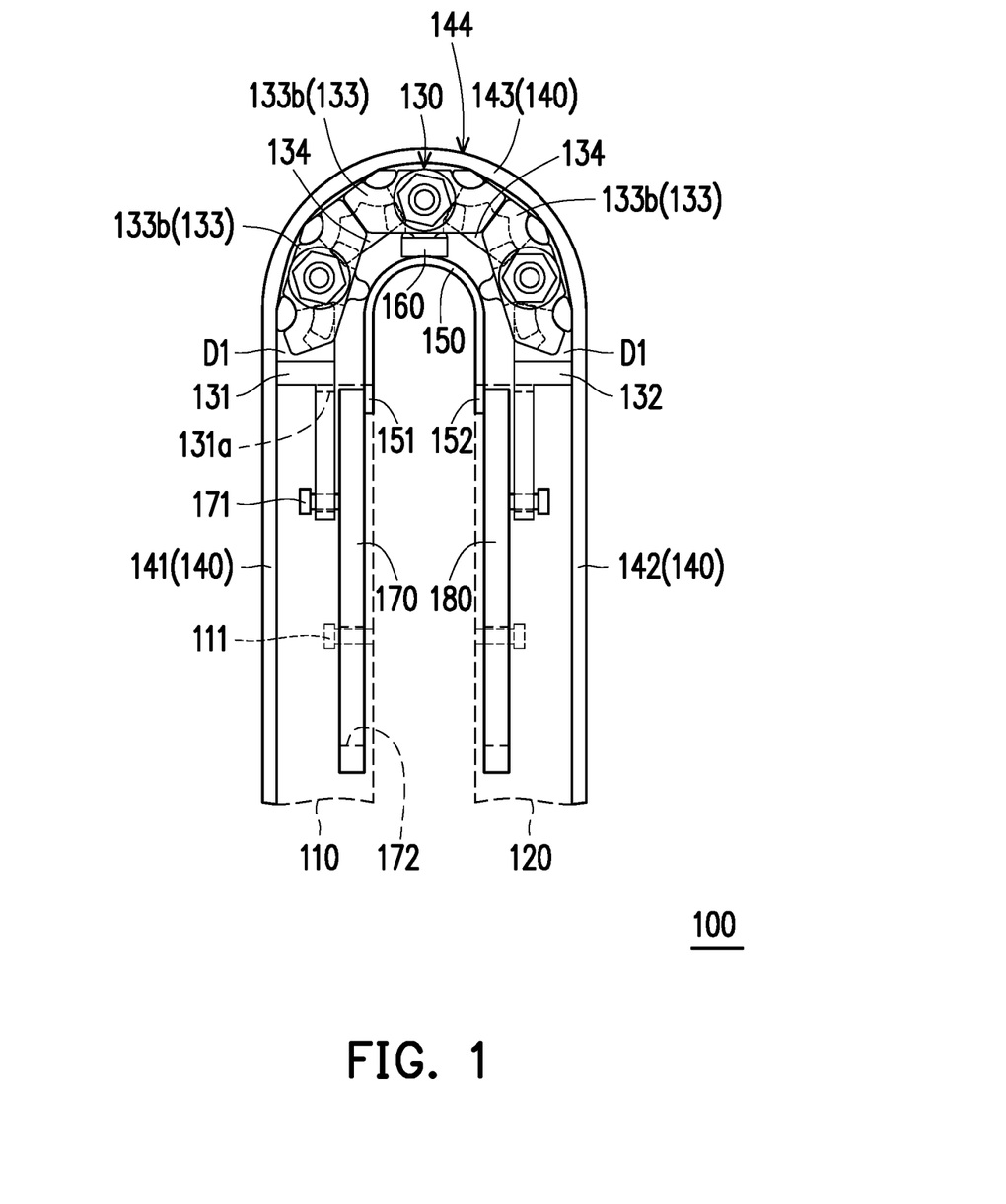
FIG. 1 is a schematic partial side view of a foldable electronic device of an embodiment of the disclosure in a folded state.
Figure 2:
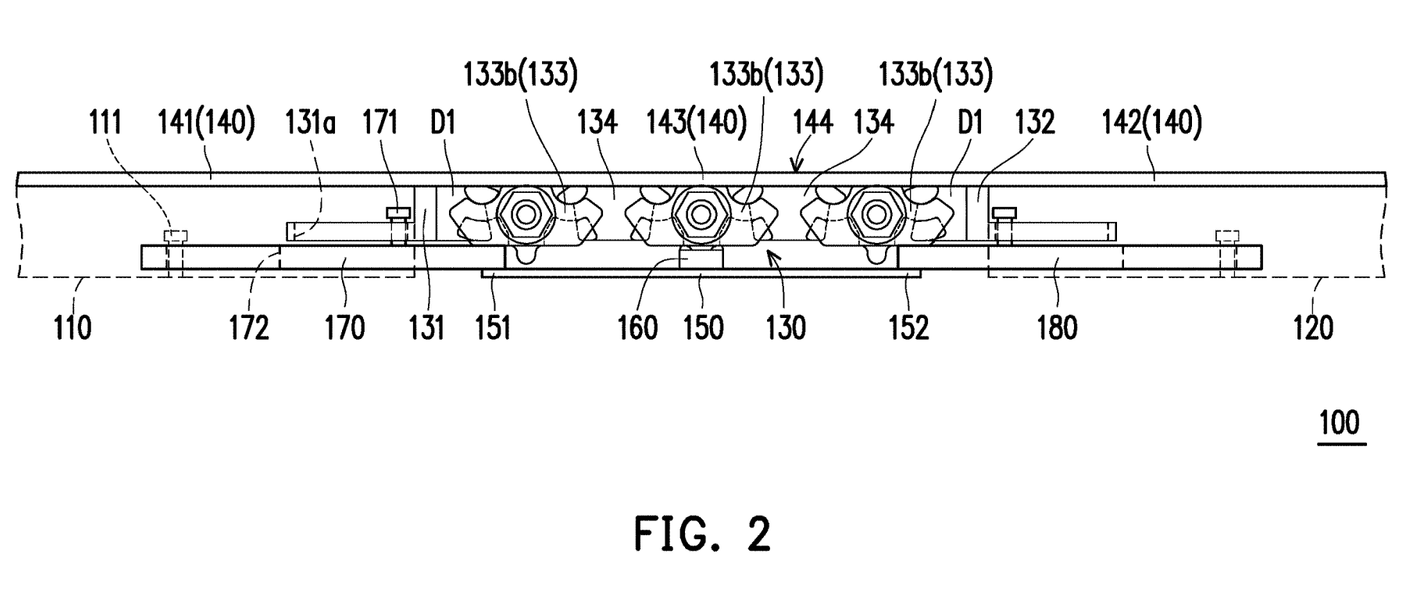
FIG. 2 is a schematic partial side view of the foldable electronic device of FIG. 1 transformed to an unfolded state.

FIG. 1 is a partial schematic side view of a foldable electronic device of an embodiment of the disclosure in a folded state. FIG. 2 is a partial schematic side view of the foldable electronic device of FIG. 1 transformed to an unfolded state. It should be noted that in order to clearly illustrate the structural configuration of the interior of a first casing 110 and a second casing 120, the first casing 110 and the second casing 120 of FIG. 1 and FIG. 2 are illustrated by dashed lines. Referring to FIG. 1 and FIG. 2, in the embodiment of the disclosure, a foldable electronic device 100 can be integrated to a smart phone, a tablet computer, a notebook computer or a display. The foldable electronic device 100 includes a first casing 110, a second casing 120, a hinge structure 130 and a foldable display 140. The first casing 110 and the second casing 120 can be relatively rotatable via the hinge structure 130.

Specifically, the first casing 110 is connected to the second casing 120 via the hinge structure 130. The foldable display 140 includes a first bonding portion 141, a second bonding portion 142 and a foldable portion 143. The first bonding portion 141 is secured to the first casing 110, and a second bonding portion 142 is secured to the second casing 120. The foldable portion 143 is located between the first bonding portion 141 and the second bonding portion 142 and is aligned with the hinge structure 130. For example, the foldable display 140 is designed to be folded outwardly so that the foldable portion 143 is located directly above the hinge structure 130. No matter the foldable display 140 is in a folded state or an unfolded state, a display surface 144 of the foldable display 140 faces outwardly. In other embodiments, the foldable display can be designed to be folded inwardly so that the foldable portion is located directly below the hinge structure. Hence, the display surface of the folded foldable display is bent and faces inwardly, and the display surface of the foldable display is flattened and faces outwardly after being transformed to the unfolded state.

In the embodiment of the disclosure, the hinge structure 130 includes a first frame 131, a second frame 132, a plurality of first hinge block sets 133 and a plurality of second hinge blocks 134. The first frame 131 is connected to the first casing 110, and the second frame 132 is connected to the second casing 120. The first frame 131 and the first casing 110 are secured to each other, and the second frame 132 and the second casing 120 are secured to each other. The first hinge block sets 133 are arranged between the first frame 131 and the second frame 132, and thus connecting the first frame 131 and the second frame 132. In addition, any two adjacent first hinge block sets 133 are connected by one of the second hinge blocks 134. When the foldable electronic device 100 is transformed to the unfolded state or the folded state, a user pulls the first casing 110 and the second casing 120 outwardly or pushes the first casing 110 and the second casing 120 inwardly. The first frame 131 moves synchronously with the first casing 110, and the second frame 132 moves synchronously with the second casing 120. At this time, the first frame 131 and the second frame 132 drive the first hinge block sets 133 and the second hinge blocks 134 so that the hinge structure 130 is transformed to a flat state or a bent state.

Furthermore, when the foldable electronic device 100 is transformed from the folded state to the unfolded state, the hinge structure 130 is transformed from the bent state to the flat state and generates a stroke difference. The first casing 110 and the second casing 120 are driven by the hinge structure 130, such that the distance between the first casing 110 and the second casing 120 is gradually increased. Accordingly, after the foldable electronic device 100 is transformed to the unfolded state and the hinge structure 130 is transformed to the flat state, the foldable display 140 driven by the first casing 110 and the second casing 120 can be flattened and has good flatness.

The foldable portion 143 of the foldable display 140 covers the positive side of the hinge structure 130. The foldable electronic device 100 further includes a flexible component 150, a connecting component 160, a first sliding cover 170 and a second sliding cover 180. The flexible component 150, the first sliding cover 170 and the second sliding cover 180 cover the back side of the hinge structure 130 to improve the completeness of the appearance of the foldable electronic device 100. Therefore, the foldable portion 143 and the flexible component 150 of the foldable display 140 are respectively located at the two opposite sides of the hinge structure 130, or the hinge structure 130 is located between the foldable portion 143 and the flexible component 150 of the foldable display 140.

Specifically, the flexible component 150 is aligned with the hinge structure 130, and the hinge structure 130 is connected to the hinge structure 130 via the connecting component 160. The connecting component 160 may be secured to the hinge structure 130 by a mechanical connection such as engaging or locking, or be secured to the hinge structure 130 by other mechanical connections. For example, the flexible component 150 can be a flexible sheet that can be bent. The flexible component 150 can be made of rubber, silicone or other suitable materials. On the other hand, the flexible component 150 and the connecting component 160 can be an integrally formed structure, which is produced via a double injection molding technique. The rigidity of the connecting component 160 is greater than the rigidity of the flexible component 150. The connecting component 160 is less susceptible to deformation, and the material can be plastic or other suitable materials.

In the embodiment of the disclosure, the flexible component 150 has a first end 151 and a second end 152 opposite to the first end 151. The connecting component 160 is located between the first end 151 and the second end 152, and falls at an intermediate point of the flexible component 150. On the other hand, the first sliding cover 170 is connected to the first end 151 of the flexible component 150, and the second sliding cover 180 is connected to the second end 152 of the flexible component 150. Specifically, the first sliding cover 170 is slidably connected to the first frame 131 and the first casing 110. The second sliding cover 180 is slidably connected to the second frame 132 and the second casing 120. For example, the first sliding cover 170 is slidably connected to a sliding groove 131a of the first frame 131 via a pin 171, and the first casing 110 is slidably connected to a sliding groove 172 of the first sliding cover 170 via a pin 111. The sliding mechanism between the second sliding cover 180 and the second frame 132 is the same as or similar to the sliding mechanism between the first sliding cover 170 and the first frame 131, and the sliding mechanism between the second casing 120 and the second sliding cover 180 is the same as or similar to the sliding mechanism between the casing 110 and the first sliding cover 170 and thus will not be described again.

During the process of the first casing 110 and the second casing 120 being moved relatively via the hinge structure 130, the flexible component 150 may be bent or flattened with the hinge structure 130. The first frame 131 and the first casing 110 may slide relative to the first sliding cover 170, and second frame 132 and the second casing 120 may slide relative to the second sliding cover 180. Therefore, the flexible component 150, the first sliding cover 170 and the second sliding cover 180 do not affect the movement of the first casing 110, the second casing 120 and the hinge structure 130. On the other hand, in order to ensure the consistency of the moving strokes and the stability of the movement of the first casing 110, the second casing 120 and the hinge structure 130, the connecting component 160 is connected to the first hinge block set 133 located at the intermediate point of the hinge structure 130, and the first sliding cover 170 and the second sliding cover 180 are symmetrically disposed at two sides of the connecting component 160.

Figure 3:
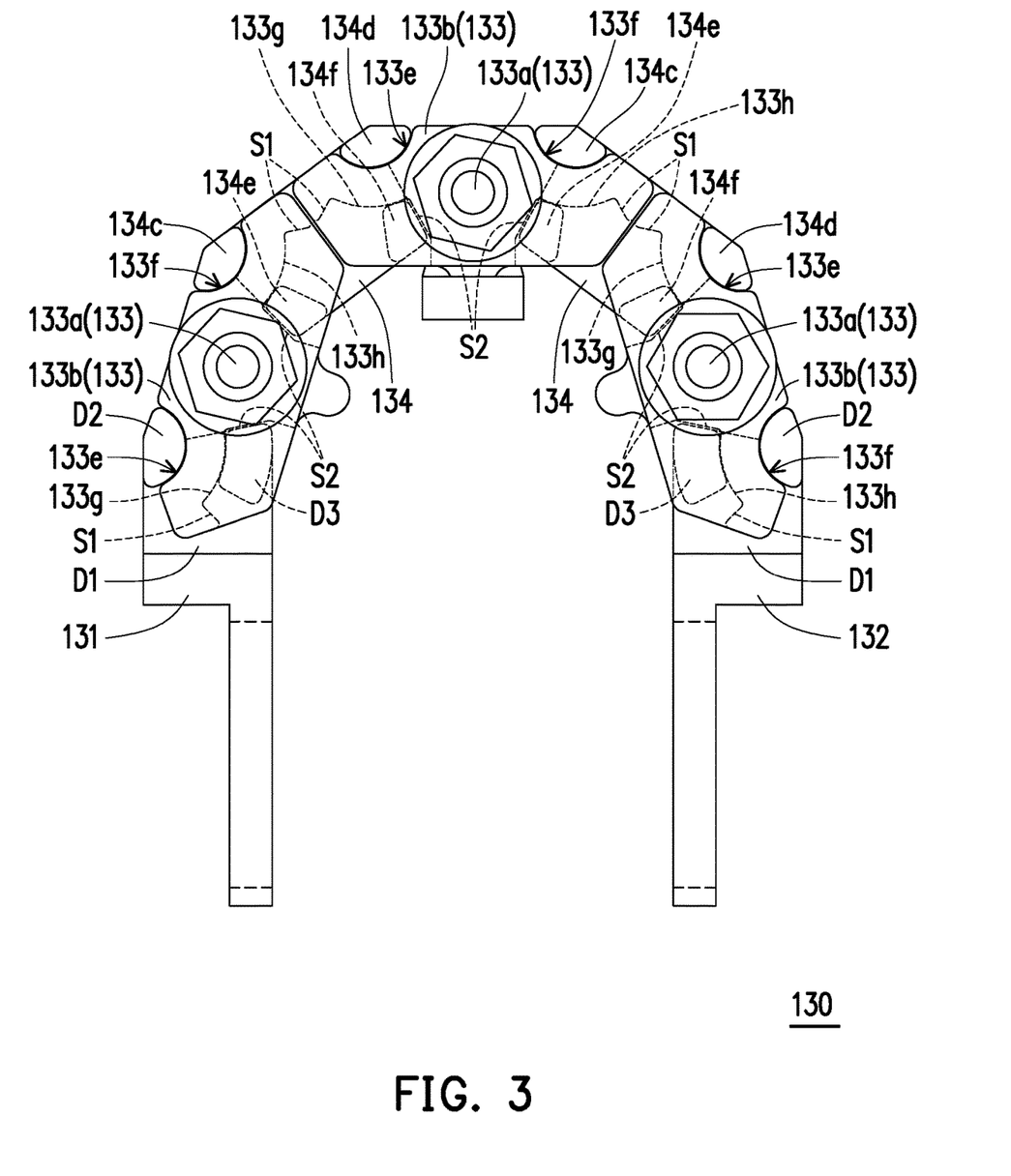
FIG. 3 is a schematic enlarged view of the hinge structure of FIG. 1.
Figure 4:
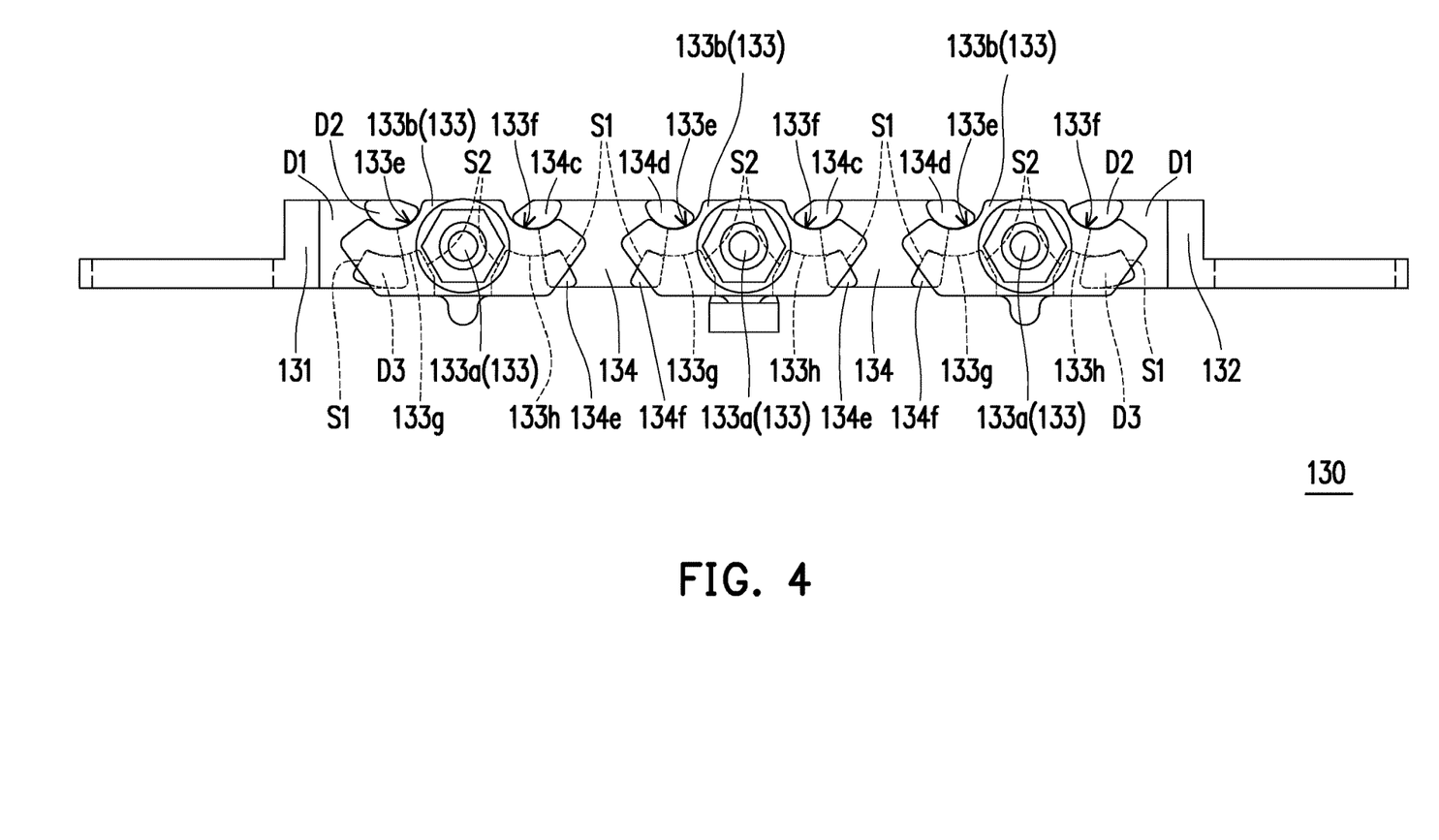
FIG. 4 is a schematic enlarged view of the hinge structure of FIG. 2.
Figure 5A:
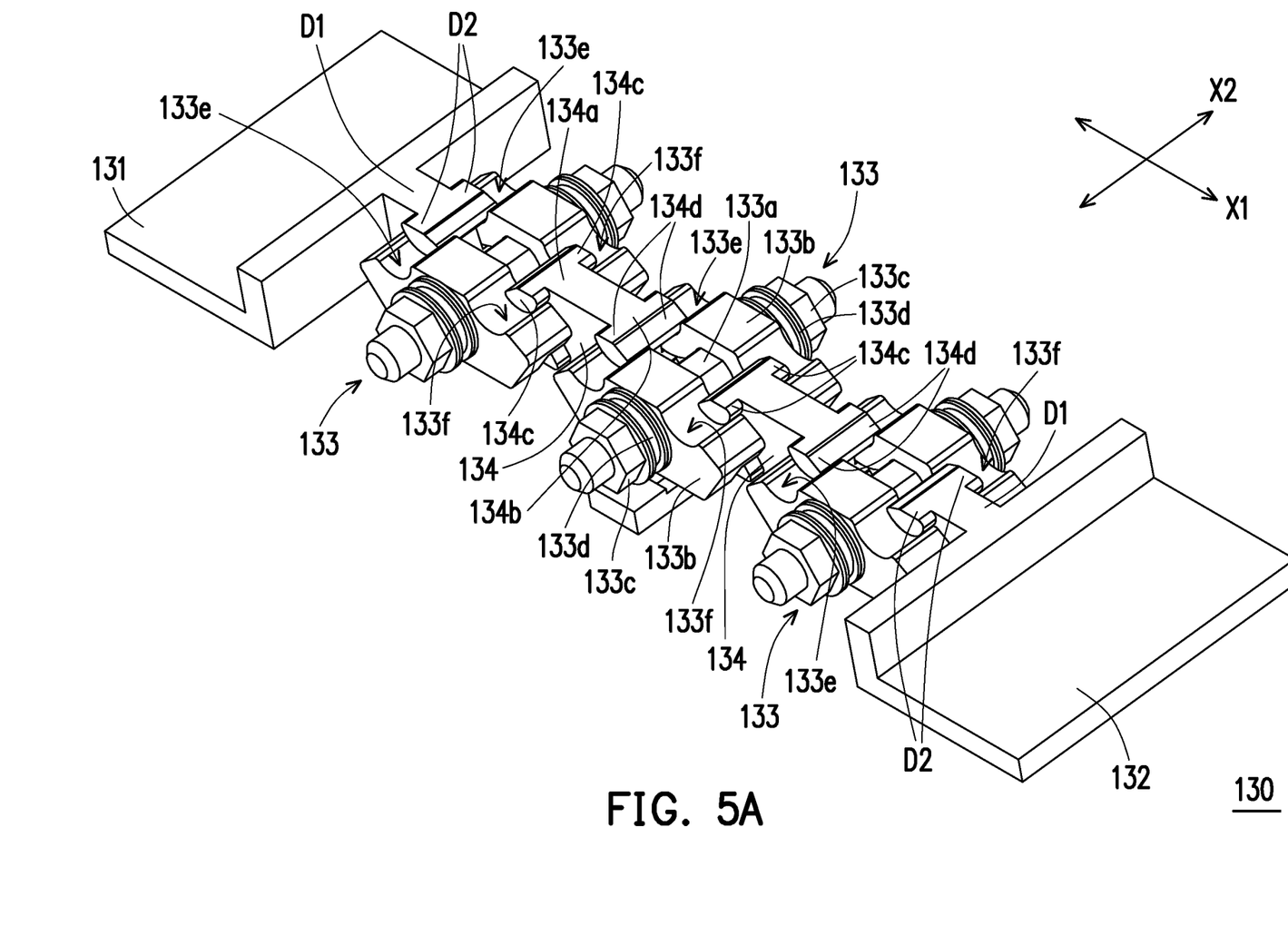
FIG. 5A is a schematic structural view of a hinge structure according to an embodiment of the disclosure in a flat state.
Figure 5B:
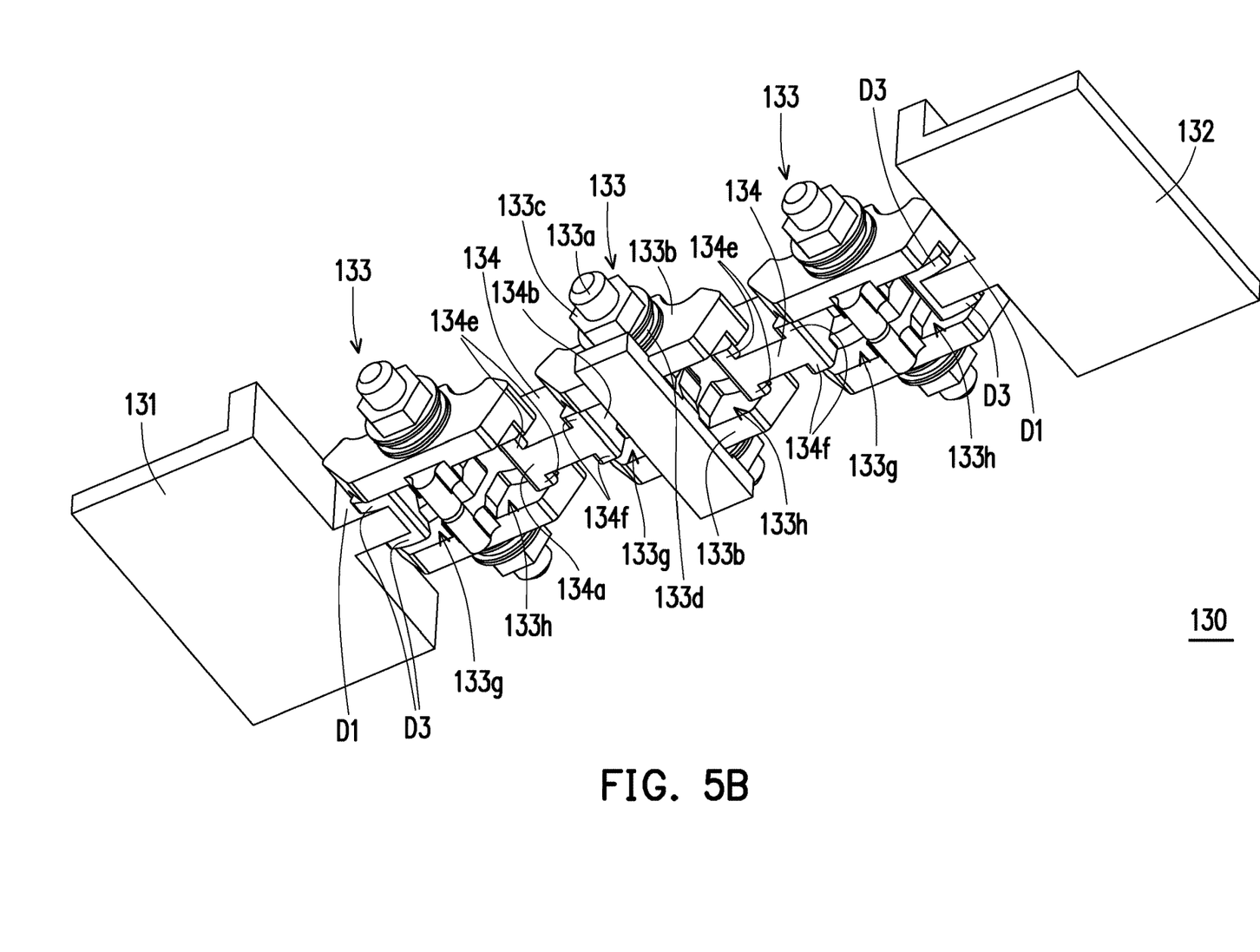
FIG. 5B is a schematic structural view of the hinge structure of FIG. 5A in another viewing angle.
Figure 5C:
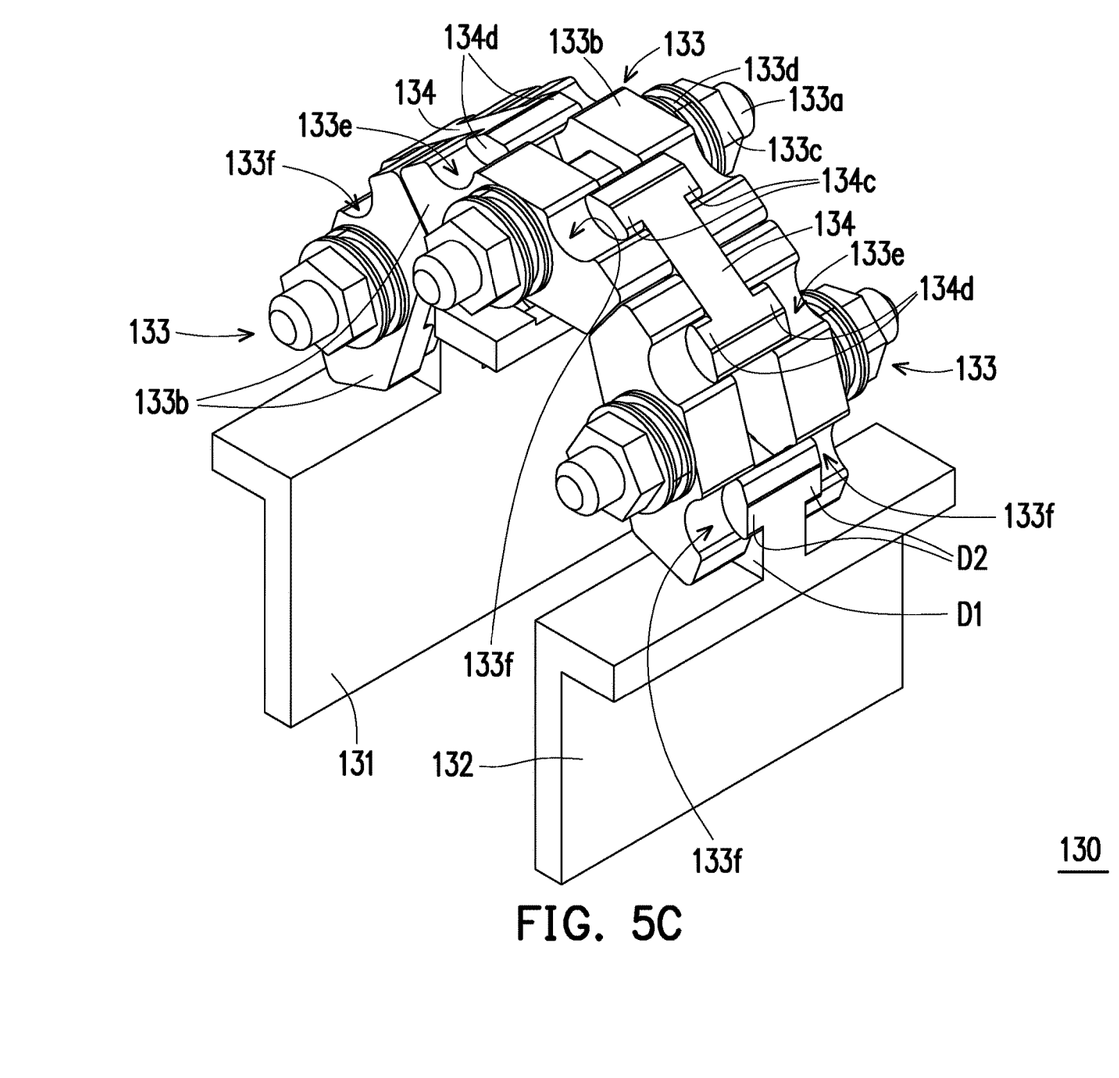
FIG. 5C is a schematic structural view of the hinge structure of FIG. 5A transformed to a bent state.

FIG. 3 is a schematic enlarged view of the hinge structure of FIG. 1. FIG. 4 is a schematic enlarged view of the hinge structure of FIG. 2. FIG. 5A is a schematic structural view of a hinge structure according to an embodiment of the disclosure in a flat state. FIG. 5B is a schematic structural view of the hinge structure of FIG. 5A in another viewing angle. FIG. 5C is a schematic structural view of the hinge structure of FIG. 5A transformed to a bent state. Referring to FIG. 3 to FIG. 5C, in the embodiment of the disclosure, the number of the first hinge block sets 133 of the hinge structure 130 is N, and the number of the second hinge blocks 134 is N−1. N is a positive integer and is greater than or equal to 3. FIG. 3A to FIG. 3C illustrate that the hinge structure 130 is composed of three first hinge block sets 133 and two second hinge blocks 134. It can be understood that the number of these first hinge block sets 133 in the hinge structure 130 and the number of second hinge blocks 134 may be increased as design requirement and be regularly arranged along a first axis X1 or a second axis X2 perpendicular to the first axis X1.

Take the two adjacent first hinge block sets 133 and one of the second hinge blocks 134 configured to connect the two adjacent first hinge block sets 133 as an example, the second hinge block 134 is clamped by two first hinge block sets 133. Each of the first hinge block sets 133 includes a positioning pin 133a and two first hinge blocks 133b arranged symmetrically. The positioning pin 133a is inserted into the two first hinge blocks 133b and connects two first hinge blocks 133b. Specifically, the first hinge block 133b has a through hole for the positioning pin 133a to pass through. After the positioning pin 133a passes through the two first hinge blocks 133b in pairs, the two first hinge blocks 133b cannot be rotated relative to the positioning pin 133a.

On the other hand, the second hinge block 134 includes a first half portion 134a and a second half portion 134b. The two first hinge blocks 133b of one of the first hinge block sets 133 contact and clamp the first half portion 134a, and the two first hinge blocks 133b of the other first hinge block set 133 contact and clamp the second half portion 134b. That is, the two first hinge blocks 133b of one of the first hinge block sets 133 are separated by the first half portion 134a, and the two first hinge blocks 133b of the other first hinge block set 133 are separated by the second half portion 134b.

Furthermore, the two first hinge block sets 133 are symmetrically disposed at two sides of the second hinge block 134, and a connection line between the two positioning pins 133a of the two first hinge block sets 133 passes the second hinge block 134. In other words, the positioning pin 133a of one of the first hinge block sets 133 and the positioning pin 133a of the other first hinge block set 133 are located at two sides of the second hinge block 134. For example, each of the first hinge block sets 133 further includes two nuts 133c and two torque washer sets 133d. If the surface of each of the first hinge blocks 133b for contacting the second hinge block 134 is regarded as an inner surface, each of the torque washer sets 133d is sleeved on the positioning pin 133a and abuts the outer surface of the corresponding first hinge block 133b. On the other hand, each of the nuts 133c is sleeved on the positioning pin 133a and abuts the corresponding torque washer sets 133d. In the extending direction of the positioning pin 133a (parallel to the second axis X2), two torque washer sets 133d are located at two sides of the two first hinge blocks 133b, and the two nuts 133c are located at two sides of the two torque washer sets 133d.

By tightening the second hinge block 134 and the two first hinge blocks 133b via the two nuts 133c and the two torque washer sets 133d, it can prevent the second hinge block 134 from slipping between the two first hinge blocks 133b. It can also prevent the second hinge block 134 and the two first hinge blocks from sliding on the positioning pin 133a and help maintain the distance between the two inner surfaces of the two first hinge blocks 133b. It can be understood that the two nuts 133c and the part of the positioning pin 133a for the two nuts 133c to be locked with has an internal screw thread and an external screw thread. As the strokes of the two nuts 133c locking into the positioning pin 133a increase, the amount of deformation generated by the two torque washer sets 133d pushed by the two nuts 133c also increases, and thus increasing the frictional torque between the two first hinge blocks 133b and the second hinge block 134 clamped therebetween.

Following the above, the second hinge block 134 clamped between the two first hinge blocks 133b can slide relative to the two first hinge blocks 133b within a specific stroke. By adjusting the frictional torque between the two first hinge blocks 133b of each of the first hinge block sets 133 and the second hinge block 134 clamped therebetween, the user may have different tactile feedbacks during the state transformation of the hinge structure 130. After the state transformation of the hinge structure 130 stops, the hinge structure 130 can maintain in a bent state, a flat state, or a transitional state between the two above-mentioned states based on the frictional torque between the two first hinge blocks 133b of each of the first hinge block sets 133 and the second hinge block 134 clamped therebetween.

For example, the frictional torque between the two first hinge blocks 133b of the first hinge block set 133 located at the middle of the hinge structure 130 and the two second hinge blocks 134 clamped therebetween may be set smaller than the frictional torque between the two first hinge blocks 133b of the other first hinge block sets 133 and the second hinge block 134 clamped therebetween. Accordingly, during the process of state transformation of the hinge structure 130, the two second hinge blocks 134 first slide relative to the two first hinge blocks 133b of the first hinge block set 133 located at the middle of the hinge structure 130 firstly, and then the two second hinge blocks 134 slide relative to the two first hinge blocks 133b of the other first hinge block sets 133.

Referring to FIG. 3 to FIG. 5C, in the embodiment of the disclosure, the structure of each of the second hinge blocks 134 is symmetrically designed to ensure that the sliding stroke amount of the first half portion 134a with respect to one of the two adjacent first hinge block sets 133 equals to the sliding stroke amount of the second half portion 134b with respect to the other one of the two adjacent first hinge block sets 133. Specifically, each of the second hinge blocks 134 has a pair of first upper guide convex portions 134c, a pair of second upper guide convex portions 134d, a pair of first lower guide convex portions 134e and a pair of second lower guide convex portions 134f. The pair of first upper guide convex portions 134c and the pair of second upper guide convex portions 134d of each of the second hinge blocks 134 are symmetrically disposed, and the pair of first lower guide convex portions 134e and the pair of second lower guide convex portions 134f of each of the second hinge blocks 134 are symmetrically disposed. The pair of first upper guide convex portions 134c and the pair of first lower guide convex portions 134e are located at the first half portion 134a, and the pair of second upper guide convex portions 134d and the pair of second lower guide convex portions 134d are located at the second half portion 134b.

On the other hand, the structure of each of the first hinge blocks 133b is symmetrically designed to ensure that the sliding stroke amount of the two second hinge blocks 134 slidably connected at two sides of the same first hinge block set 133 is consistent. Specifically, each of the first hinge block 133b has a first upper sliding groove 133e and a second upper sliding groove 133f which are symmetrically disposed, and a first lower sliding groove 133g and a second lower sliding groove 133h which are symmetrically disposed. A pair of the second upper guide convex portions 134d of one of the second hinge blocks 134 are slidably disposed in the two first upper sliding grooves 133e of the two first hinge blocks 133b arranged in groups. Also, a pair of the first upper guide convex portions 134c of one of the second hinge blocks 134 are slidably disposed in the two second upper sliding grooves 133f of the two first hinge blocks 133b arranged in groups. A pair of the second lower guide convex portions 134f of one of the second hinge blocks 134 are slidably disposed in the two first lower sliding grooves 133g of the two first hinge blocks 133b arranged in groups. Also, a pair of the first lower guide convex portions 134e of one of the second hinge blocks 134 are slidably disposed in the two second lower sliding groove 133h of the two first hinge blocks 133b arranged in groups.

In the two adjacent first hinge block sets 133 and the second hinge block 134 clamped therebetween, a pair of the first upper guide convex portions 134c of the second hinge block 134 are slidably disposed in two second upper sliding grooves 133f of the two first hinge block 133b of one of the first hinge block sets 133. Also, a pair of the first lower guide convex portions 134e of the second hinge block 134 are slidably disposed in the two second lower sliding grooves 133h of the two first hinge blocks 133b of one of the first hinge block sets 133. On the other hand, a pair of the second upper guide convex portions 134d of the second hinge block 134 are slidably disposed in the two first upper sliding grooves 133e of the two first hinge blocks 133b of the other first hinge block set 133. Moreover, a pair of the second lower guide convex portions 134f of the second hinge block 134 are slidably disposed in the two first lower sliding grooves 133g of the two first hinge blocks 133b of the other first hinge block set 133.

Based on the above-mentioned structural cooperation between the upper and lower guide convex portions of any one of the second hinge blocks 134 and the upper and lower sliding grooves of the corresponding two first hinge blocks 133b, the second hinge block 134 is slidably connected to the corresponding two first hinge block 133b to slide within a specific stroke and is supported by the corresponding two first hinge blocks 133b. On the other hand, the cooperation of the upper guide convex portion of the second hinge block 134 with the upper sliding groove of the corresponding two first hinge blocks 133b can be used as the rotation and sliding fulcrum. The cooperation of the lower guide convex portion of the second hinge block 134 with the lower sliding grooves of the corresponding two first hinge blocks 133b can be used to determine the rotational and sliding directions of the second hinge block 134 and determine the rotational and sliding strokes of the second hinge block 134.

Moreover, in each of the first hinge blocks 133b, the first lower sliding groove 133g and the second lower sliding groove 133h are symmetrically disposed at two sides of the positioning pin 133a. The first lower sliding groove 133g and the second lower sliding groove 133h both have a first stop point S1 away from the positioning pin 133a and a second stop point S2 close to the positioning pin 133a. Regarding the hinge structure 130 in the flat state, a pair of the first lower guide convex portions 134e and a pair of the second lower guide convex portions 134f of each of the second hinge blocks 134 are located at a centrifugal position. That is, in the two adjacent first hinge block sets 133, the pair of first lower guide convex portions 134e are located at the two first stop points S1 of the two second lower sliding grooves 133h of the two first hinge blocks 133b of one of the first hinge block sets 133. Also, the pair of second lower guide convex portions 134f are located at the two first stop points S1 of the two first lower sliding grooves 133g of the two first hinge blocks 133b of the other first hinge block set 133. At this time, the distance between the two adjacent first hinge block sets 133 is the largest.

Regarding the hinge structure 130 in a bent state, a pair of the first lower guide convex portions 134e and a pair of the second lower guide convex portions 134f of each of the second hinge blocks 134 are located at a centripetal position. That is, in the two adjacent first hinge block sets 133, the pair of first lower guide convex portions 134e are located at the two second stop points S2 of the two second lower sliding grooves 133h of the two first hinge blocks 133b of one of the first hinge block sets 133. The pair of second lower guide convex portions 134f are located at the two second stop points S2 of the two first lower sliding grooves 133g of the two first hinge blocks 133b of the other first hinge block set 133. At this time, the distance between the two adjacent first hinge block sets 133 is the smallest.

Therefore, the hinge structure 130 can generate a stroke difference from the bent state to the flat state to increase the distance between the first casing 110 (illustrated in FIG. 1 and FIG. 2) and the second casing 120 (illustrated in FIG. 1 and FIG. 2). The foldable display 140 (illustrated in FIG. 1 and FIG. 2) driven by the first casing 110 (illustrated in FIG. 1 and FIG. 2) and the second casing 120 (see FIG. 1 and FIG. 2) can be flattened and has good flatness.

In the embodiment of the disclosure, one of the first hinge block sets 133 is movably connected to the first frame 131, and another one of the first hinge block sets 133 is movably connected to the second frame 132. The first frame 131 and the second frame 132 both have a connecting portion D1, a pair of third upper guide convex portions D2 located at the connecting portion D1 and a pair of the third lower guide convex portions D3 located at the connecting portion D1. In the first frame 131 and first hinge block set 133 connected to each other, the connecting portion D1 is clamped between the two first hinge blocks 133b. The pair of third upper guide convex portions D2 are slidably connected to the two first upper sliding grooves 133e of the two first hinge blocks 133b. The pair of third lower guide convex portions D3 are slidably connected to the two first lower sliding grooves 133g of the two first hinge blocks 133b. On the other hand, the connecting portion D1 of the first frame 131 and the second hinge block 134 clamped by the first hinge block set 133 are respectively located at two sides of the positioning pin 133a.

Therefore, the pair of third lower guide convex portions D3 of the first frame 131 can slide in the two first lower sliding grooves 133g of the two first hinge blocks 133b. When the foldable electronic device 100 (illustrated in FIG. 1 and FIG. 2) is in the unfolded state, the pair of third lower guide convex portions D3 are located at the centrifugal position, that is, the pair of third lower guide convex portions D3 are located at the two first stop points S1 of the two first lower sliding grooves 133g. When the foldable electronic device 100 (illustrated in FIG. 1 and FIG. 2) is in a folded state, the pair of third lower guide convex portions D3 are located at a centripetal position, that is, the pair of third lower guide convex portions D3 are located at the two second stop points S2 of the two first lower sliding grooves 133g.

In the second frame 132 and the first hinge block set 133 connected to each other, the connecting portion D1 is clamped between the two first hinge blocks 133b. The pair of third upper guiding convex portions D2 are slidably connected to the two second upper sliding grooves 133f of the two first hinge blocks 133b. Also, the pair of third lower guiding convex portions D3 are slidably connected to the two second lower sliding grooves 133h of the two first hinge blocks 133b. On the other hand, the connecting portion D1 of the second frame 132 and the second hinge block 134 clamped by the first hinge block set 133 are respectively located at two sides of the positioning pin 133a.

Therefore, the pair of third lower guide convex portions D3 of the second frame 132 can slide in the two second lower sliding grooves 133h of the two first hinge blocks 133b. When the foldable electronic device 100 (illustrated in FIG. 1 and FIG. 2) is in the unfolded state, the pair of third lower guide convex portions D3 are located at the centrifugal position, that is, the pair of third lower guide convex portions D3 are at the two first stop points S1 of the two second lower sliding grooves 133h. When the foldable electronic device 100 (illustrated in FIG. 1 and FIG. 2) is in the unfolded state, the pair of third lower guide convex portions D3 are located at a centripetal position, that is, the pair of third lower guide convex portions D3 are at two second stop points S2 of the two second lower sliding grooves 133h.

Based on the above, the two casings of the foldable electronic device of the disclosure can be relatively rotated via the hinge structure, and thus the foldable electronic device is transformed from a folded state to an unfolded state. Furthermore, during the process of the foldable electronic device being transformed from the folded state to the unfolded state, the hinge structure is transformed from a bent state to a flat state and generates a stroke difference. Meanwhile, the two casings are driven by the hinge structure, such that the distance between the two casings is gradually increased. Accordingly, after the foldable electronic device is transformed to the unfolded state and the hinge structure is transformed to the flat state, the foldable display driven by the two casings can be flattened and has good flatness.

Although the disclosure has been described with reference to the above embodiments, it will be apparent to the person of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A foldable electronic device, comprising:
   a first casing;
   a second casing;
   a hinge structure, comprising:
      a first frame, connected to the first casing;
      a second frame, connected to the second casing;
      a plurality of first hinge block sets, arranged between the first frame and the second frame, and thus connecting the first frame and the second frame; and
      a plurality of second hinge blocks, wherein two of the first hinge block sets adjacent to each other are connected by one of the second hinge blocks;
   a foldable display, comprising a first bonding portion secured to the first casing, a second bonding portion secured to the second casing, and a foldable portion between the first bonding portion and the second bonding portion, wherein the foldable portion is aligned with the hinge structure;
   a flexible component, aligned with the hinge structure, wherein the hinge structure is located between the foldable portion of the foldable display and the flexible component, wherein the flexible component has a first end and a second end relative to each other;
   a connecting component, connecting the flexible component and the hinge structure;
   a first sliding cover, connected to the first end of the flexible component, and the first sliding cover being slidably connected to the first frame and the first casing; and
   a second sliding cover, connected to the second end of the flexible component, and the second sliding cover being slidably connecting to the second frame and the second casing.

2. The foldable electronic device according to claim 1, wherein the number of the first hinge block sets is N, the number of the second hinge blocks is N−1, N is a positive integer, and N is greater than or equal to 3.

3. The foldable electronic device according to claim 1, wherein each of the first hinge block sets comprises a positioning pin and two first hinge blocks symmetrically disposed, and the positioning pin is inserted into the two first hinge blocks and thus connecting the two first hinge blocks.

4. The foldable electronic device according to claim 3, wherein the positioning pin of one of the two first hinge block sets adjacent to each other and the positioning pin of the other one of the two of the first hinge block sets adjacent to each other are located at two sides of one of the second hinge blocks.

5. The foldable electronic device according to claim 3, wherein each of the second hinge blocks comprises a first half portion and a second half portion,
   the two first hinge blocks of one of the two first hinge block sets adjacent to each other clamp the first half portion of one of the second hinge blocks, and
   the two first hinge blocks of the other one of the two first hinge block sets adjacent to each other clamp the second half portion of one of the second hinge blocks.

6. The foldable electronic device according to claim 5, wherein each of the second hinge blocks has a pair of first upper guide convex portions, a pair of second upper guide convex portions, a pair of first lower guide convex portions and a pair of second lower guide convex portions,
   the pair of first upper guide convex portions and the pair of second upper guide convex portions of each of the second hinge blocks are symmetrically disposed, and the pair of first lower guide convex portions and the pair of second lower guide convex portions of each of the second hinge blocks are symmetrically disposed,
   the pair of first upper guide convex portions and the pair of first lower guide convex portions of each of the second hinge blocks are located at the first half portion, and
   the pair of second upper guide convex portions and the pair of second lower guide convex portions of each of the second hinge blocks are located at the second half portion.

7. The foldable electronic device according to claim 6, wherein each of the first hinge blocks has a first upper sliding groove, a second upper sliding groove, a first lower sliding groove and a second lower sliding groove,
   the first upper sliding groove and a second upper sliding groove of each of the first hinge blocks are symmetrically disposed, and the first lower sliding groove and the second lower sliding groove of each of the first hinge blocks are symmetrically disposed,
   the pair of first upper guide convex portions of one of the second hinge blocks are slidably disposed in the two second upper sliding grooves of the two first hinge blocks of one of the two first hinge block sets adjacent to each other,
   the pair of first lower guide convex portions of one of the second hinge blocks are slidably disposed in the two second lower sliding grooves of the two first hinge blocks of one of the two first hinge block sets adjacent to each other,
   the pair of second upper guide convex portions of one of the second hinge blocks are slidably disposed in the two first upper sliding grooves of the two first hinge blocks of the other one of the two first hinge block sets adjacent to each other, and
   the pair of second lower guide convex portions of one of the second hinge blocks are slidably disposed in the two first lower sliding grooves of the two first hinge blocks of the other one of the two first hinge block sets adjacent to each other.

8. The foldable electronic device according to claim 7, wherein in each of the first hinge blocks, the first lower sliding groove and the second lower sliding groove are symmetrically disposed at two sides of the positioning pin, the first lower sliding groove and the second lower sliding groove both have a first stop point away from the positioning pin and a second stop point close to the positioning pin, the pair of first lower guide convex portions of one of the second hinge blocks are located at the two first stop points of the two second lower sliding grooves of the two first hinge blocks of one of the two first hinge block sets adjacent to each other, and the pair of second lower guide convex portions are located at the two first stop points of the two first lower sliding grooves of the two first hinge blocks of the other one of the two first hinge block sets adjacent to each other, or the pair of first lower guide convex portions of one of the second hinge blocks are located at the two second stop points of the two second lower sliding grooves of the two first hinge blocks of one of the two first hinge block sets adjacent to each other, and the pair of second lower guide convex portions are located at the two second stop points of the two first lower sliding grooves of the two first hinge blocks of the other one of the two first hinge block sets adjacent to each other.

9. The foldable electronic device according to claim 7, wherein one of the first hinge block sets is connected to the first frame, and another one of the first hinge block sets is connected to the second frame, the first frame and the second frame both have a connecting portion, a pair of third upper guide convex portions located at the connecting portion and a pair of third lower guide convex portions located at the connecting portion, in the first frame and one of the first hinge block sets connected to each other, the connecting portion is clamped between two of the first hinge blocks, wherein the pair of third upper guide convex portions are slidably connected to the two first upper sliding grooves of the two first hinge blocks, and the pair of third lower guide convex portions are slidably connected to the two first lower sliding grooves of the two first hinge blocks, and in the second frame and another of the first hinge block sets connected to each other, the connecting portion is clamped between the two first hinge blocks, wherein the pair of third upper guide convex portions are slidably connected to the two second upper sliding grooves of the two first hinge blocks, and the pair of third lower guide convex portions are slidably connected to the two second lower sliding grooves of the two first hinge blocks.

\* \* \* \* \*